United States Patent [19]
Kobayashi

[11] Patent Number: 5,218,920
[45] Date of Patent: Jun. 15, 1993

[54] STEERING ARRANGEMENT FOR SMALL WATERCRAFT

[75] Inventor: Noboru Kobayashi, Iwata, Japan

[73] Assignee: Yamaha Hatsudoki Kabushiki Kaisha, Iwata, Japan

[21] Appl. No.: 656,192

[22] Filed: Feb. 15, 1991

Related U.S. Application Data

[63] Continuation-in-part of Ser. No. 457,553, Dec. 27, 1989, Pat. No. 5,101,751.

[30] Foreign Application Priority Data

Feb. 16, 1990 [JP] Japan .................................. 2-36836

[51] Int. Cl.⁵ .............................................. B63H 25/00
[52] U.S. Cl. .................................. 114/144 R; 280/775
[58] Field of Search ............... 114/144 R, 144 E, 150; 280/775; 74/492, 493, 495, 480 B, 504; 244/229, 234; 440/42, 53

[56] References Cited

U.S. PATENT DOCUMENTS

| | | | |
|---|---|---|---|
| 2,436,153 | 2/1948 | Sanmori | 114/144 R |
| 2,629,356 | 2/1953 | Whiting | 114/144 R |
| 2,839,312 | 6/1958 | Barenyi et al. | |
| 4,299,407 | 11/1981 | Simson | 280/775 |
| 4,334,489 | 6/1982 | Seitzinger et al. | 114/150 |
| 4,531,921 | 7/1985 | Teraura et al. | 440/53 |

FOREIGN PATENT DOCUMENTS

| | | | |
|---|---|---|---|
| 998391 | 1/1952 | France | |
| 1082380 | 9/1967 | United Kingdom | |
| 883130 | 11/1981 | United Kingdom | 280/775 |

Primary Examiner—Jesus D. Sotelo
Attorney, Agent, or Firm—Ernest A. Beutler

[57] ABSTRACT

A small watercraft of the jet propulsion type having a cockpit that is adapted to accommodate either one or two riders. When one rider is accommodated he may sit in the center of the seat and operate the watercraft from the center thereof. When two riders are positioned, one may be the operator and may operate the watercraft from one side thereof. To permit this, a steering control is disclosed that is moveable by a power device between either a central or side position. In one embodiment, the power device comprises an electrical motor and in another embodiment the power device comprises a hydraulic motor driven by a reversible electric motor and reversible fluid pump.

5 Claims, 5 Drawing Sheets

STEERING ARRANGEMENT FOR SMALL WATERCRAFT

CROSS REFERENCE TO RELATED APPLICATION

This invention is a continuation-in-part of my application of the same title, Ser. No. 457,553, filed Dec. 27, 1989 and assigned to the Assignee hereof now issued as U.S. Pat. No. 5,101,751 on Apr. 7, 1992.

BACKGROUND OF THE INVENTION

This invention relates to a steering arrangement for a small watercraft and more particularly to a control mechanism for a vehicle in which the control mechanism may be moved by a power device to at least any of two selected locations.

As noted in my aforesaid co-pending application, of which this application is a continuation-in-part, there are many instances where it may be desireable to control a vehicle from any of a plurality of selected locations. For example, in a watercraft of the type disclosed in the parent application, the watercraft may be operated by a single operator sitting in the center of the watercraft or by the operator seated at one side of the watercraft with a passenger at the other side. That application discloses an arrangement wherein the operator may manually move the control to the selected location. Although this construction has obvious advantages, it is also desireable if the control movement may be accomplished automatically by a power device.

It is, therefore, a principal object of this invention to provide an improved control arrangement for a vehicle that may be moved by a power device between with of two selected control locations.

It is a further object of this invention to provide a steering or other control mechanism for a small watercraft which permits the watercraft to be operated in either of two selected locations and which is moved by a power device thereto.

SUMMARY OF THE INVENTION

This invention is adapted to be embodied in a vehicle having a rider's compartment adapted to accommodate an operator in either of two locations. A control mechanism is provided for operation by the operator and is moveable between the two locations. In accordance with the invention, power means are provided for moving the control between its locations

DETAILED DESCRIPTION OF THE PREFERRED EMBODIMENTS OF THE INVENTION

Figure 1:
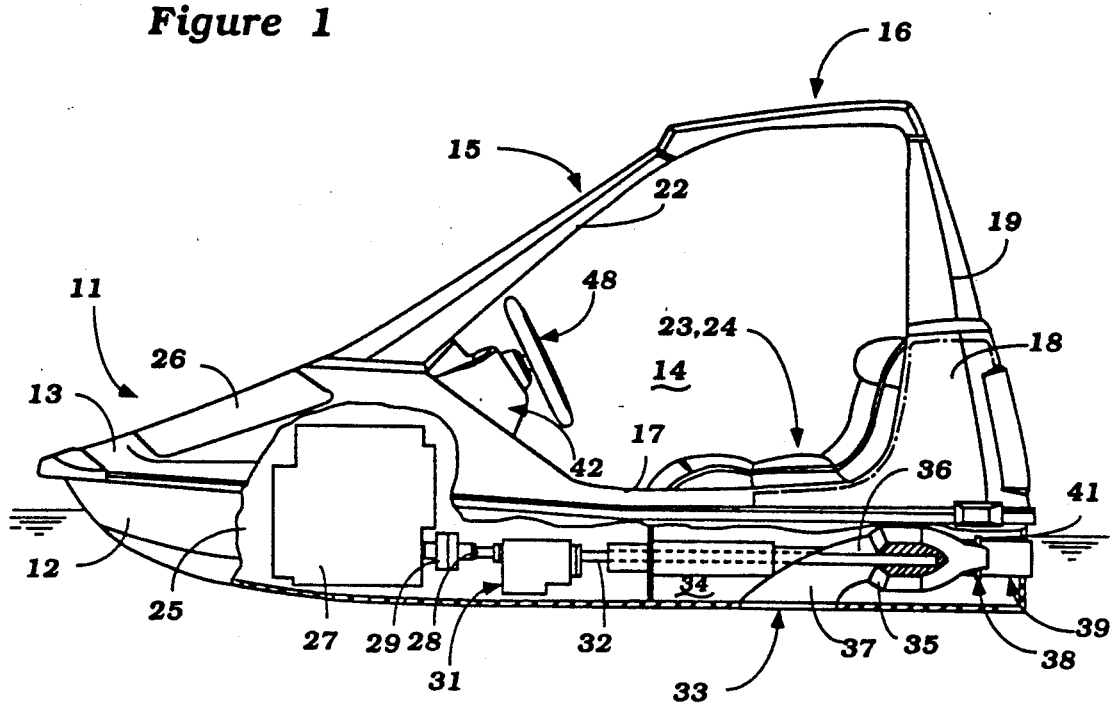
FIG. 1 is a side elevational view of a small watercraft constructed in accordance with an embodiment of the invention, with a portion broken away and other portions shown in sections.
Figure 3:
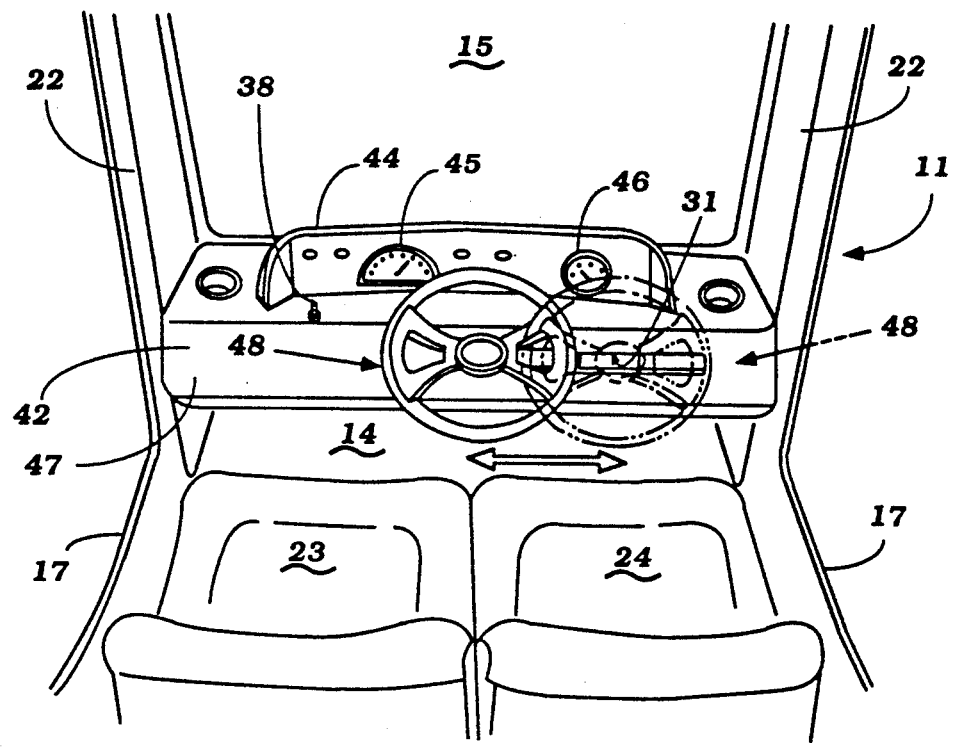
FIG. 3 is a perspective view of the passenger compartment from the rear and above showing the steering mechanism in its position when there is a single operator in the watercraft in solid line and in the position there is a operator and a passenger, in phantom.
Figure 2:
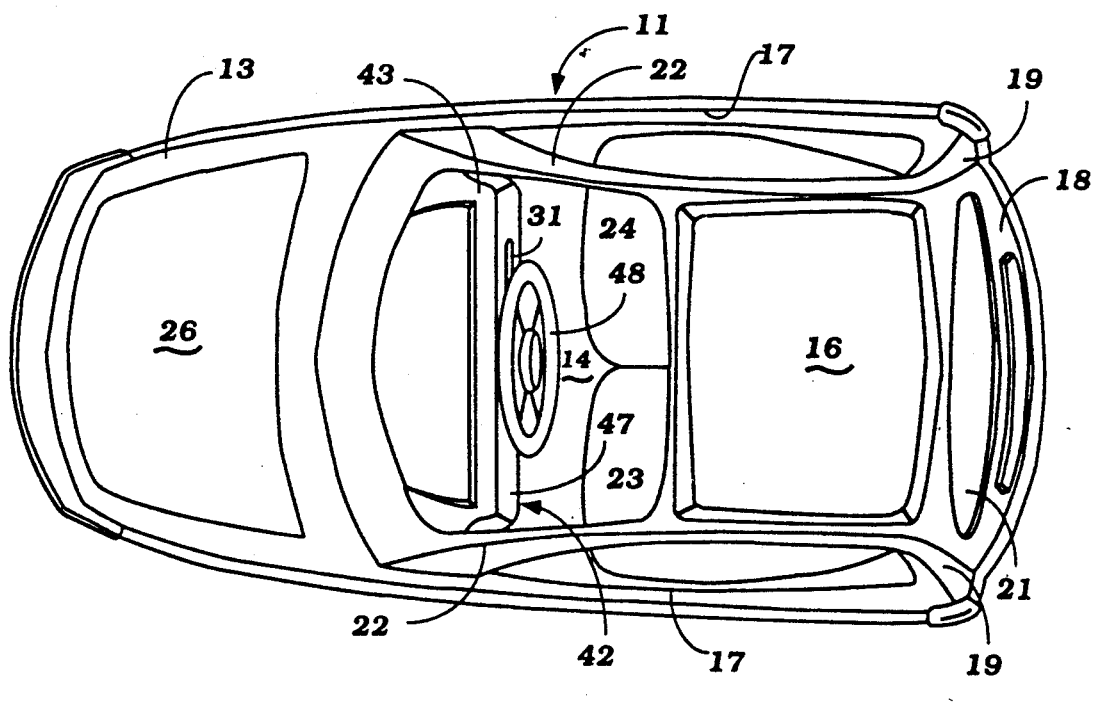
FIG. 2 is a top plane view of the watercraft.
Figure 5:
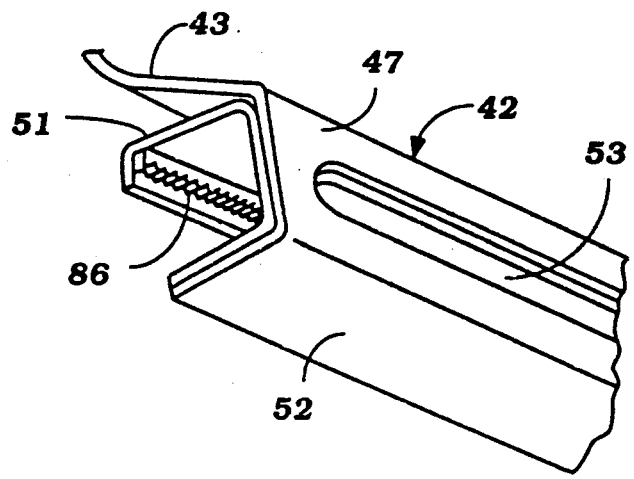
FIG. 5 is a perspective view showing the dashboard of the watercraft from the underside and to the left.

Referring in detail to the drawings and initially primarily to FIGS. 1 through 3, a small watercraft constructed in accordance with an embodiment of the invention is identified generally by the reference numeral 11. The small watercraft 11 is comprised of a hull assembly made up of a lower, hull portion 12 and an upper, deck portion 13. The hull portion 12 and deck portion 13 may be conveniently formed from a molded fiberglass reinforced resin although other materials ma be utilized in conjunction with the invention.

The hull portion 12 and deck portion 13 cooperate together to form a rearwardly positioned passenger compartment, indicated generally by the reference numeral 14. The passenger compartment 14 is defined at least in part by a rearwardly slanted windshield 15 that may support the upper and forward end of a roof 16. The deck portion 13 is provided with a pair of cutaway side parts 17 that afford access to the passenger compartment 14 and which terminate in an upwardly extending rear portion 18. Rear roof supports 19 support the rear of the roof 16 from the section 18. The rear roof support 19 may be a single component that defines a rear window opening 21.

The windshield 15 may be of the frameless type or may include a center pane of glass that is supported by a pair of upstanding windshield posts 22 that form at least in part the structural support for the forward portion of the roof 16.

Within the passenger compartment 14 there is provided either a single bench type seat or a pair of adjacent bucket type seats 23 and 24. The seats 23 and 24 are provided with both cushion portions and back rest portions with the back rest portions being nested between the rear deck portion 18. As a result, the seating position of the occupants of the passengers compartment 14 are at the extreme rear end of the watercraft.

The forward portion of the hull portion 12 and deck portion 13 define an engine compartment area 25 that is accessible through a removable hatch cover 26 which forms a part of the deck portion 13. An internal combustion engine 27, of any known type may be positioned within the engine compartment 25 and drives an output shaft 28 through a flexible coupling 29. The output shaft 28 is, in turn, connected to a self cleaning transmission mechanism, indicated generally by the reference numeral 31 and having a construction as best described in my co-pending entitled "Cleaning Arrangement For Water Jet Propulsion", Ser. No. 457,552, filed Dec. 27, 1989 and assigned to the Assignee of this application. That disclosure is incorporated herein by reference and, therefore, further description of this mechanism is not believed to be necessary.

It is to be understood, however, that the mechanism 31 normally drives an output shaft 32 in a forward drive direction. The output shaft 32 may, however, selectively be reversed in direction of rotations for self cleaning of a jet propulsion unit, indicated generally by the reference numeral 33, in selected forward or reverse directions for normal drive or self cleaning purposes as described in my noted co-pending application.

The hull portion 12 defines a rearwardly positioned tunnel or recess 34 in which the jet propulsion unit 33 is positioned. The jet propulsion unit 33 includes an impeller 35 that is affixed to an impeller shaft 36 which is, in turn, driven by the self cleaning transmission output shaft 32.

The impeller 35 draws water through a downwardly facing water inlet 37 and discharges it through a discharge nozzle 38 and steering and discharge nozzle 39. The steering and discharge nozzle 39 is supported for pivotal movement about a generally vertically extending axis relative to the main discharge nozzle 38 by means of pivot pins 41 for steering the watercraft 11 in a manner now to be described.

As has been noted, the seating arrangement for the watercraft permits the watercraft to be operated by a single rider, driver, or to be occupied by the rider, driver and one passenger. If the watercraft is operated by only a single rider, driver, that individual should seat centrally in the watercraft so as to avoid heeling from one side to the other. If the watercraft is balanced so that when the single rider, operator sits in the seat 23, then if a passenger occupies the seat 24, the watercraft 11 will obviously heel to the left. Therefore, it is desirable to provide an arrangement wherein the watercraft can be operated centrally of the seats 23 and 24 when there is only a single rider, operator or from one side thereof when a passenger is also in the passengers compartment 14. The arrangement, now to be described, affords such an operation of the watercraft.

A dashboard 42 is carried by the deck portion 13 and extends across the forward portion of the passenger compartment 14 at the base of the windshield 15. The dashboard 42 has an upper shelf 43 from which extends a display panel 44 that may contain some controls for the watercraft and gauges such as a water speed indicator 45 and fuel level gauge 46.

Figure 6:
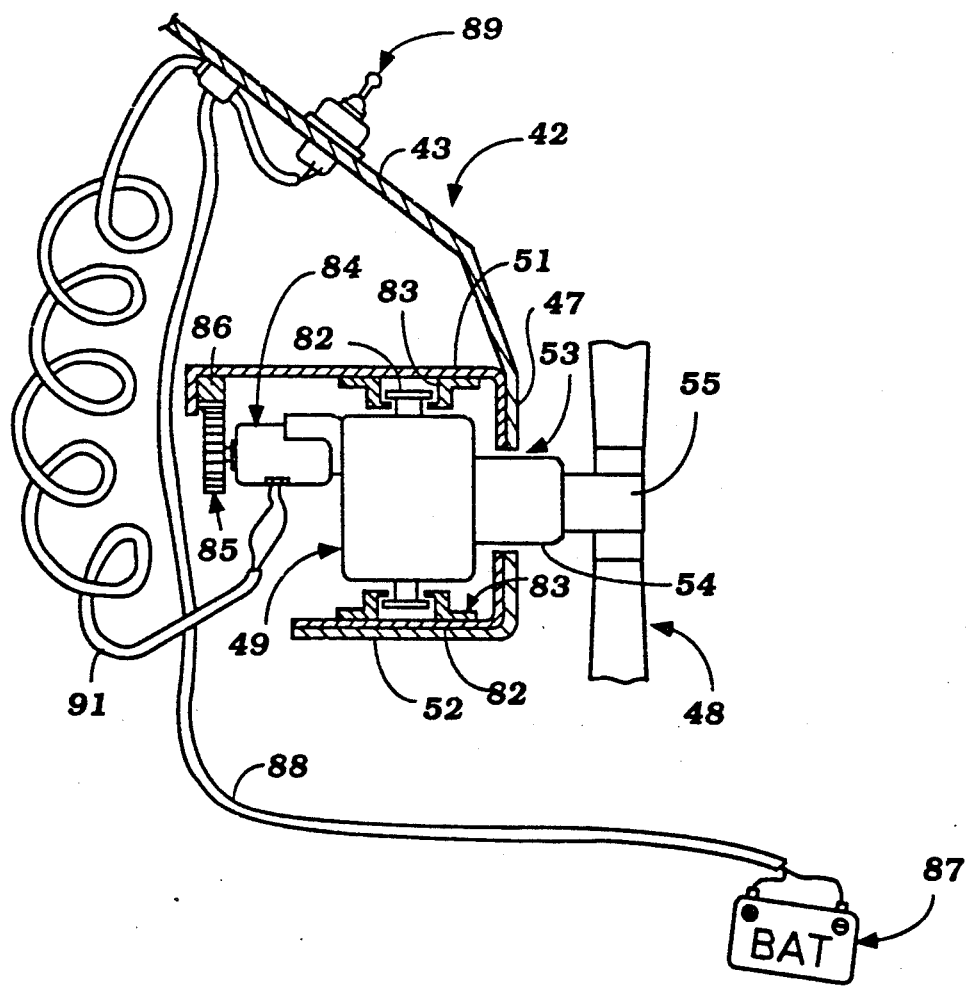
FIG. 6 is a cross sectional view of the dashboard and steering mechanism showing the steering mechanism in one position.
Figure 8:
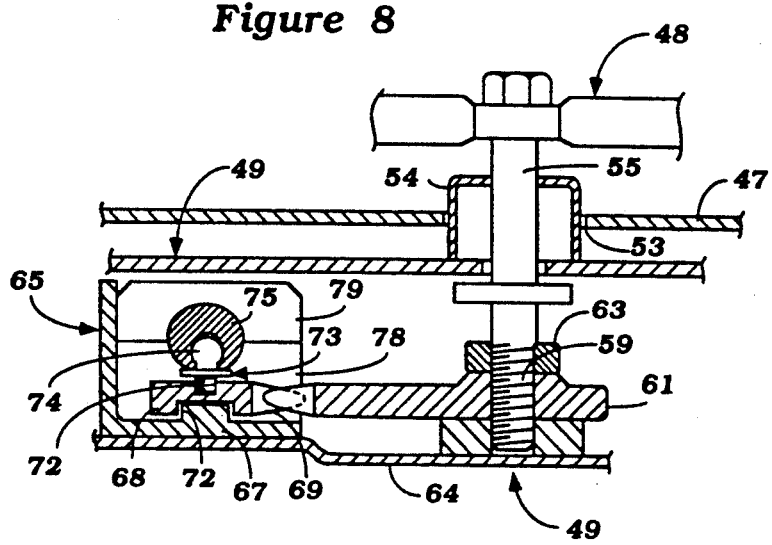
FIG. 8 is a cross section view showing the steering mechanism.

In addition, the dashboard 42 has a generally vertically extending face 47 from which extends a steering wheel 48. The steering wheel 48 is coupled to a steering gear box assembly, indicated generally by the reference numeral 49 and shown in most detail in FIGS. 4, 6 and 8. The steering gear box assembly 49 and steering wheel 48 are supported for movement transversely across the dashboard 42 in a manner to be described so as to permit the steering wheel 48 to be positioned centrally as shown in FIG. 2 and the solid line views of FIGS. 3 and 4 wherein the watercraft may be steered by an operator seated centrally on the seats 23 and 24 or to a side position, as shown in phantom in FIGS. 3 and 4, wherein the watercraft 11 may be steered by the operator seated on the seat 23.

Figure 7:
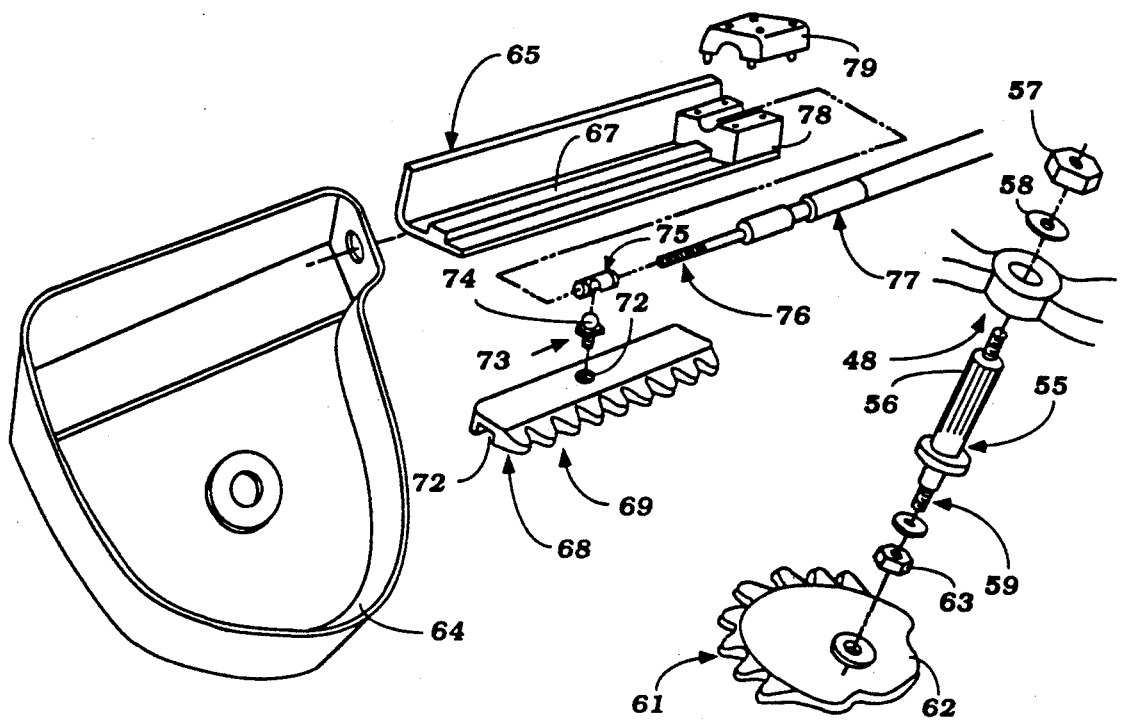
FIG. 7 is an enlarged, exploded perspective view showing the steering mechanism.

The construction by which the steering wheel 46 and steering gear assembly 49 is supported for such movement and can be locked in the respective positions will now be described by particular reference to FIGS. 4 through 8. It should be noted that the dashboard assembly 42 is formed from molded fiberglass reinforced resin like the hull portion 12 and deck portion 13. There is provided within a channel shape of the dash board 42 a reinforcing channel 51 which is supported on a lower lip 52 of the dash panel 42. The dash panel face 47 and channel 51 are formed with a transversely extending slot 53 through which a hub portion 54 of the steering gear 49 extends. The hub portion 54 journals a steering shaft, indicated generally by the reference numeral 55, which has a splined end portion 56 onto which the hub of the steering wheel 48 is affixed by means of a nut 57 and washer 58 (FIG. 7). As a result, rotation of the steering wheel 48 will effect rotation of the steering shaft 55.

The lower end of the steering shaft 55 is threaded as at 59 and receives a sector gear assembly, indicated generally by the reference numeral 61 and which has a hub portion 62. A lock nut 63 serves to lock the sector gear 61 for rotation with the steering shaft 55.

The steering gear assembly 49 includes a housing 64 which is closed by a suitable cover plate that forms the hub position 54. An angle assembly 65, which may be formed as an extrusion, provides a track 67 and is affixed transversely across the housing 64 in a suitable manner. A gear rack, indicated generally by the reference numeral 68 has rack like teeth 69 which are engaged with the teeth of the sector gear 61. In addition, the rack has groove 72 that is complimentarily to the track 67 and which slideably supports the rack 68 for transverse movement along the track 67

The rack 68 is provided with a tapped opening 72 in which the threaded post o f a spherical connector 73 is received. The spherical connector 73 has a spherical portion 74 that provides a universal connection to a connector 75. The connector 75 is, in turn, threaded onto a threaded rod 76 of the bowden wire actuator of a bowden wire assembly, indicated generally by the reference numeral 77. The sheath of the bowden wire assembly 77 is affixed relative to the angle 65 and its track 67 and by means of a block type retainer having a base portion 78 and a cover portion 79 that are affixed to each other as to clamp the sheath in position.

Figure 4:
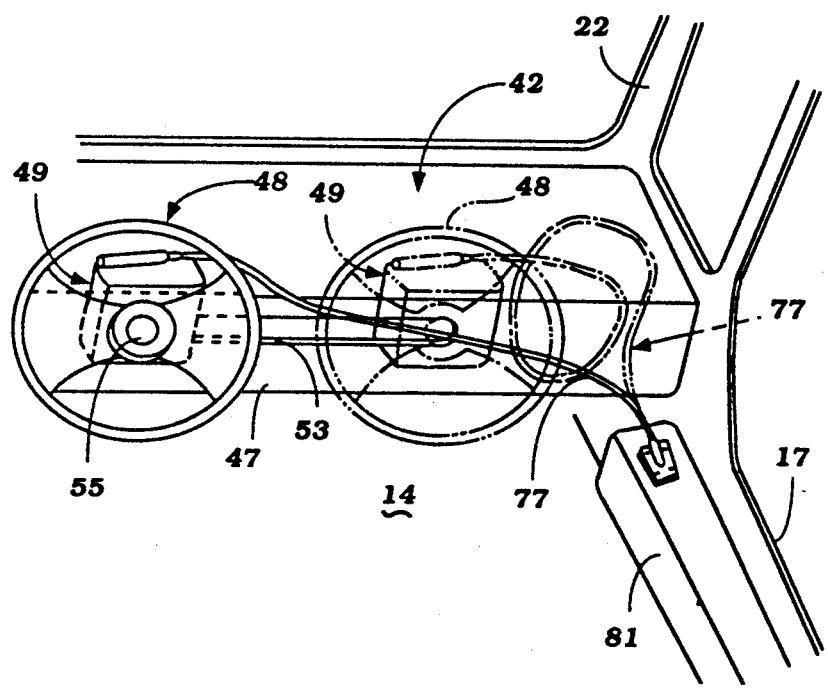
FIG. 4 is a further enlarged perspective view from the rear and to the left of the passenger compartment showing interrelationship between the steering wheel and the steering mechanism in each position of the steering wheel.

As may be seen in FIG. 4, the bowden wire assembly 77 extends from behind the dash board 42 to a control housing 81 that extends along one side of the passenger compartment 14. The wire actuator is, at the opposite end, connected to a lever (not shown) affixed to the steering nozzle 39 so as to rotate the steering nozzle 39 and steer the watercraft 11 upon rotation of the steering wheel 48 in a manner which is believed to be readily apparent.

Headed pins 82 (FIG. 6) are affixed to the top and bottom of the steering gear housing 64 and are received within tracks 83 affixed to the channel 51. The cooperation of the headed pins 82 with slots formed in the tracks 83 and the hub portion 54 with the slot 53 confines the movement of the steering wheel 48 and steering gear 49 along the aforedescribed path between a position centrally of the passenger compartment 14 and to on side of it.

In accordance with the invention, power means are provided for moving the steering wheel 48 between its two aforedescribed positions. In this embodiment of the invention, this power means comprises an electric motor, indicated generally by the reference numeral 84, which is affixed to the steering gear box 49 at the rear side. The output shaft of the electric motor 84 drives a pinion gear 85 which, in turn, is in meshed with a rack 86 affixed to the underside of the channel 51. The motor 84 is supplied with electrical power from a battery 87 that is positioned suitably within the watercraft and preferably within the engine compartment 25 on the longitudinal center line of the watercraft. Conductors 88 connect the battery 87 with a switch 89 that is mounted on the dash board 42, upper surface 43. Further conductors 91 connect the switch to the motor 84 for selectively energizing it in forward or reverse directions when the operator actuates the switch 89 in the appropriate direction. Limit switches (not shown) may be positioned in a suitable location so as to open the aforedescribed circuit and stop the movement of the steering wheel 48 when it is in its desired location.

Figure 9:
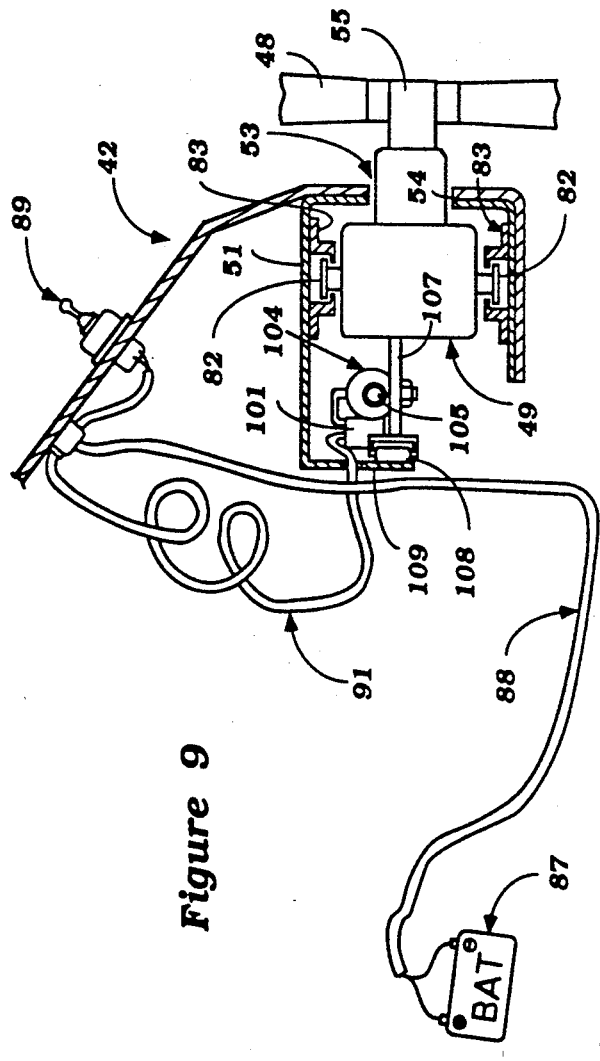
FIG. 9 is a cross sectional view, in part similar to FIG. 6, and show another embodiment of the invention.
Figure 10:
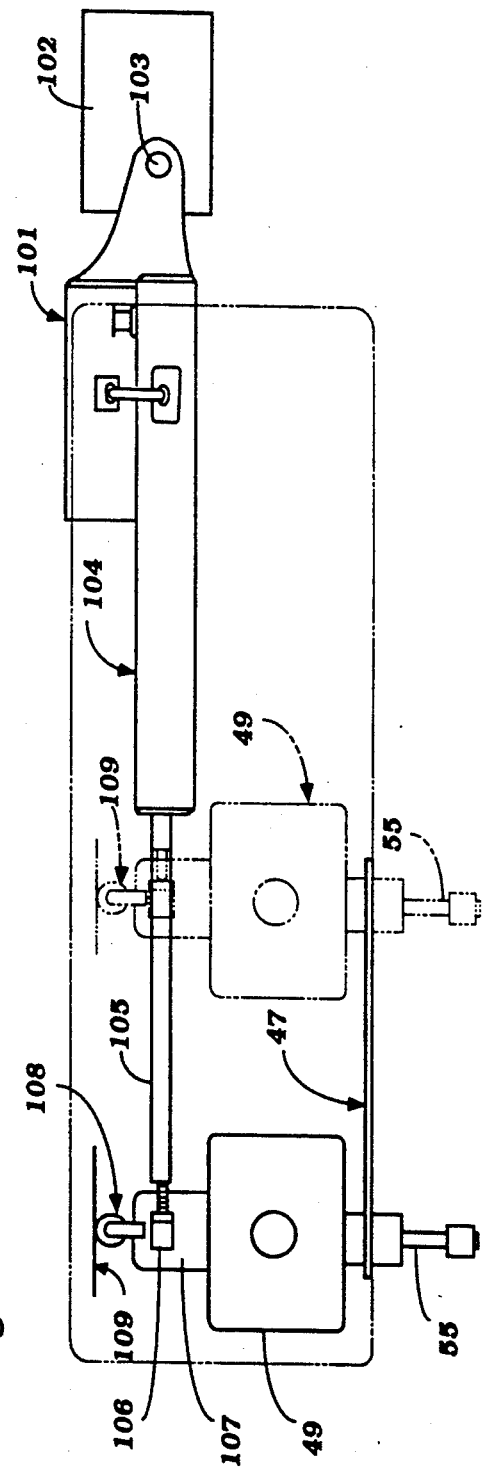
FIG. 10 is a top plane view showing the steering actuating mechanism of this embodiment.

FIGS. 9 and 10 show another embodiment which is generally the same as the embodiment of FIGS. 1 through 8. The only difference between this embodiment and that previously described, is the type of power means which actuates the steering wheel 48 and steering box 49 between its two positions. For that reason, components which are the same as those previously described have been identified by the same reference numerals and will be described again only insofar as is necessary to understand the construction and operation of this embodiment. In this embodiment, a combined reversible motor and hydraulic pump, indicated generally by the reference numeral 101 are mounted behind the dash board 42 on a mounting bracket 102 by means of a pivot pin 103. The pivotal mounting accommodates any possible irregularities in the track along which the steering gear box 49 moves. A hydraulic cylinder 104 is connected to the motor pump assembly 101 and has a piston rod 105 that is actuated by means of the hydraulic pressure generated by the electric motor and pump 101. Suitable fluid passages are provided for accommodating this hydraulic pressurization of the cylinder 104 and any of the known types of hydraulic cylinders may be employed for this purpose.

The piston rod 105 has an adjustable threaded connection 106 to a bracket 107 that is affixed to the front of the steering box 49. A roller 108 is journaled on the end of the bracket 107 and engages a guide surface 109 of the dash board so as to provide for an aft support. In addition, limit switches (not shown) may be mounted on or adjacent the surface 109 so as to provide the limits stop control for the pump motor assembly 101.

As with the previously described embodiment, a control switch 89 is mounted on the dash and is connecting to the battery 87 by conductors 88 and to the electric motor of the pump assembly by conductors 91. Therefore, like the previously described embodiment, the operator may selectively move the steering mechanism by power between its desired positions.

As may be seen in FIG. 4, the bowden wire assembly 77 has sufficient length so as to permit the steering mechanism to move between either position without interfering with the steering operation. The slack will coil behind the dashboard 42 when the steering assembly including the steering wheel 48 and steering gear 49 is moved to the extreme right hand position. If desired, the slot 53 and locking mechanism described may also be extended so that the steering wheel 48 and steering gear 49 can be accessible from the seat 24.

In the construction as thus far described, the watercraft 11 was propelled by a jet propulsion unit. It is to be understood, of course, that the invention may be also utilized in conjunction with watercraft having other forms of propulsion mechanisms. The invention, however, has particular utility in conjunction with jet propelled watercraft and particularly those of the type that are steered by dirigibly supported steering nozzles.

It is to be understood that the foregoing description is that of preferred embodiments of the invention and, although certain of modifications have been described, that various other changes and modifications may be made without departing from the spirit and scope of the invention, as defined by the appended claims.

I claim:

1. A small watercraft having a hull providing a rider's compartment accommodating an operator in either a centrally located rider's position or a side rider's position, a dash panel positioned to the front of said rider's position, a steering mechanism provided for operation of said watercraft by the operator and supported by said dash panel for movement between two locations each positioned directly in front of a respective one of said rider's positions, a steered device positioned remotely from said rider's compartment for steering of said watercraft, flexible transmitter means comprising a wire actuator connecting said steering device by said steering mechanism an a surrounding protective sheath fixed for movement with said steering mechanism relative to said dash panel and containing said wire actuator for permitting movement of said steering mechanism between said positions without effecting steering of said steered device or operation of said steering mechanism, and power means for moving said steering mechanism between its locations.

2. A small watercraft as set forth in claim 1 wherein the power means comprise an electric motor.

3. A small watercraft as set forth in claim 2 wherein the electric motor drives the control mechanism through a gear train.

4. A small watercraft as set forth in claim 2 wherein the electric motor drives a reversible fluid pump that supplies fluid under pressure to a hydraulic motor for moving the control mechanism between its positions.

5. A small watercraft as set froth in claim 2 wherein the watercraft includes a propulsion unit comprised of a jet propulsion unit and is steering by a pivotally supported steering nozzle controlled by the steering mechanism.

* * * * *